Sept. 24, 1963

M. J. D'AMORE ETAL 3,105,233

FISH CALLERS

Filed Aug. 17, 1962

INVENTORS
Michael D'Amore
BY Lewis D. Thill

*Morsell + Morsell*
Attorneys

United States Patent Office 3,105,233
Patented Sept. 24, 1963

3,105,233
FISH CALLERS
Michael J. D'Amore, Milwaukee, and Lewis D. Thill, Elm Grove, Wis., assignors to A-1 Construction & Sales Corporation, Elm Grove, Wis., a corporation of Wisconsin
Filed Aug. 17, 1962, Ser. No. 217,562
6 Claims. (Cl. 340—394)

This invention relates to improvements in fish callers, and more particularly to a novel, underwater fish-calling device which provides both a buzzing sound and a light to attract fish.

Fish callers of the buzzer type are well known in the art, being disclosed in Patents Nos. 2,920,318, 2,577,229 and 2,784,399. The object of said patented devices is to produce a buzzing noise in the water which resembles the sound emitted by a bug, thus attracting fish to the area so that they may be caught with a conventional lure or bait. As mentioned, one of the principal objects of the present invention is to provide a fish caller of this general type, but wherein an incandescent light is also provided to draw fish to the area, it being known that fish are attracted by light, as well as sound.

Another important object of the present invention is to provide an improved fish-calling device which has a minimum of components, which is constructed principally of common parts and simple stampings, and which device can be quickly and easily assembled, thus providing a fish caller which is not only superior in performance, but which can be manufactured and sold for substantially less cost than the devices presently on the market.

A further object of the present invention is to provide a battery-operated fish caller which is so designed that the user may readily adjust the buzzer mechanism from time to time to change the pitch or to compensate for weakening of the battery, and which improved device is so constructed that the battery can be easily replaced therein when exhausted.

A further object is to provide a novel fish caller which features both a sound-producing apparatus and an incandescent light to attract fish, as described, and which device is so constructed that either said sound or light-producing elements can be readily disconnected from the circuit in the event it is desired to utilize only one of said elements.

Still further objects of the present invention are to provide an improved fish caller which is absolutely liquid-tight when assembled, which device is durable and long-lasting, and which device is otherwise particularly well adapted for its intended purposes.

With the above and other objects in view, which other objects and advantages of the present device will become apparent hereinafter, the invention consists of the improved fish caller and all of its parts and combinations as set forth in the following specification and claims, and all equivalents thereof.

In the accompanying drawings, illustrating one preferred embodiment of the invention, and wherein like reference numerals designate the same parts in all of the views.

Figure 1:
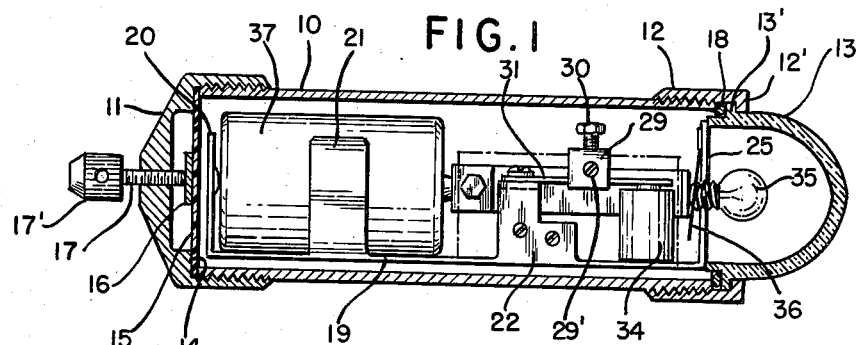
FIG. 1 is a longitudinal sectional view through the improved fish caller.

Referring now more particularly to FIG. 1 of the drawing, it will be seen that the improved fish caller comprising the present invention includes a cylindrical shell or casing 10 having a closure cap 11 in screw-threaded connection on one end thereof, and a translucent or transparent cone 13 mounted on the opposite or forward end. While the particular material from which said shell members are formed is not critical to the present invention, it is preferred to mold the same of inexpensive plastic. It is essential, of course, that said material be corrosion-resistant, non-conducting and non-buoyant.

As illustrated, said end cap 11 is provided with an internal, annular shoulder 14, and positioned between said cap shoulder and the abutting end of the casing body 10 is a disc or diaphragm 15 formed of a flexible, rubber-like material, there being a smaller disc 16 of metal or other rigid material cemented or otherwise affixed to the central portion of said diaphragm 15. When said end cap 11 is turned tightly onto the casing 10, said diaphragm provides a liquid-tight seal for the interior of said casing.

Mounted in and extending through said cap 11 is a threaded screw shaft 17 having a knurled head 17' on its outer end, there being a transverse bore through said shaft head for attachment of the device to a line. Said screw 17 is carried in a tapped bore in said cap, and can be turned inwardly to engage the aforementioned flexible diaphragm 15, bearing against the rigid center disc 16 thereon to avoid puncturing or wearing said diaphragm. By means of said screw, said flexible diaphragm can be dished inwardly to engage an electrical contact member in the casing, as will be hereinafter described. Thus, said diaphragm performs the two-fold function of providing external means for closing the electrical circuit and energizing the fish-calling mechanisms, and of providing sealing means to prevent water from entering the casing, and thus eliminating the necessity for packing around the screw-switch 17.

The forward end of the casing body 10 has a knurled nut 12 threaded thereon which is provided with an in-turned, annular flange 12', and clampingly engaged between said flange and the abutting end of the casing is an annular, radially-projecting shoulder 13' integral on the aforementioned cone 13. An O-ring gasket 18 is interposed between said cone and casing portions to provide a liquid-tight seal. The inner, base end of said cone 13 extends longitudinally into the casing a short distance to provide an annular shoulder, as shown.

Figure 2:
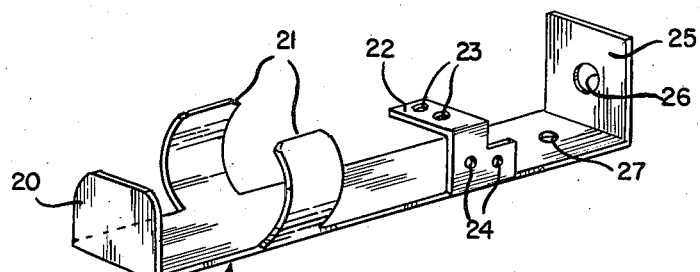
FIG. 2 is a perspective view of the unitary inner frame featured in the invention.

Referring now to FIG. 2 of the drawing, it will be seen that the inner frame member 19 in the present invention is a one-piece stamping, being formed of a metal which is a good electrical conductor. The rearward end of said frame is bent upwardly at a right angle to form an end portion 20 which can be deflected slightly about its hinge line, said frame end portion forming a flat spring and functioning in cooperation with the screw 17 and diaphragm 15 to form a part of the circuit closing mechanism, as will be hereinafter seen. In some instances it might be preferred to weld or rivet a separate spring-like end piece 20 to the frame base.

Formed on said frame 19 forwardly of said rear end member 20, are a pair of flexible clamping legs 21 which curve upwardly, as shown, and which are designed to releasably hold the battery 37, permitting the quick and easy removal and replacement of said battery when necessary. Formed on said frame forwardly of said clamping legs 21 is a bracket arm 22 which projects upwardly from the frame base and is bent to a position parallel with and projecting over said base, as illustrated. Said bracket arm has a pair of apertures 23 in its top surface and a second pair of apertures 24 in its side surface. The forward end portion 25 of the frame 19 is also bent upwardly at approximately a right angle relative to said frame, and is provided with a central aperture 26.

As mentioned, the unitary frame member 19 in the present structure can be readily stamped in a single operation, and is substantially less expensive to manufacture than the complex frame units employed in fish callers presently in use. This is one of the principal features of the present invention.

Figure 3:
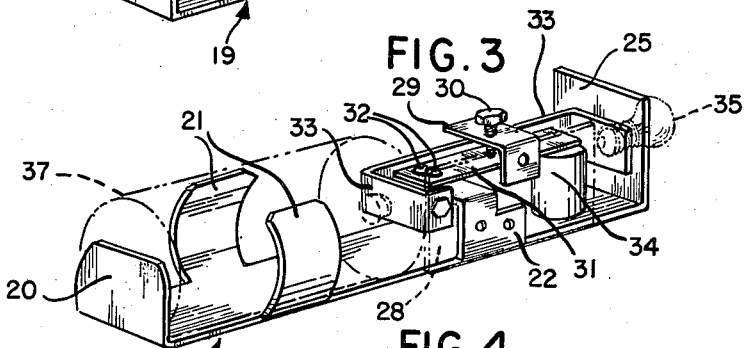
FIG. 3 is a perspective of the frame with some of the operating components assembled thereon.
Figure 4:
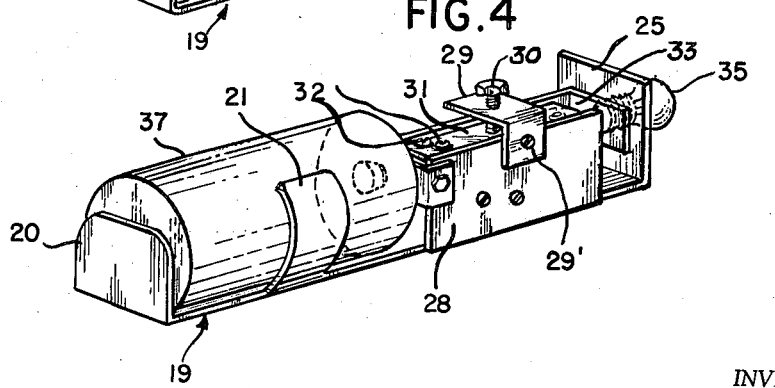
FIG. 4 is a perspective of the cartridge provided by the fully-assembled frame and operating mechanism.

With reference now to FIGS. 3 and 4 of the drawings, it will be seen that a rectangular member 28 is secured to the outer surface of the upright bracket arm 22, there being screws or rivets projected through the bracket apertures 24 to secure the same thereon. Said member 28 is formed of Bakelite or similar material which does not conduct electricity. Mounted on and extending forwardly from said bracket arm 22 is the spring armature 31 employed in the present invention, said armature being secured to said bracket arm by rivets 32 or the like projected through the apertures 23, and secured to said Bakelite piece 28 by a screw 29' is an arm 29 having a threaded screw 30 projecting vertically therethrough. Said screw 30 is vertically adjustable and is normally positioned to bear against the top surface of the armature 31, forming means for adjusting the position of said armature relative to the electromaget, as will be seen.

Also supported by the Bakelite piece 28 is a brass conducting arm 33 which extends laterally inwardly and then forwardly, as illustrated, the forward end portion of said brass arm being bent to a position parallel with the forward portion 25 of the frame member 19. As will be described, said brass arm 33 is adapted to form electrical contact means between the battery and both the buzzer and light elements featured in the present structure.

Mounted on the frame member 19 immediately behind the upturned portion 25 thereof, is an electromagnet 34 comprising a magnetizable core having electrical wiring wound thereon, said electromagnet being secured to the frame member by a screw or the like projected upwardly through an aperture 27, and there being a suitable insulating element between said frame and electromagnet. Said electromagnet 34 has a lead wire (not shown) connecting the came to the aforementioned brass arm 33, and the opposite lead wire is suitably connected to the aforementioned arm 29 in which the armature contact screw 30 is mounted. Said electrometgnet is mounted immediately below the forward, free end of the armature 31, the spacing therebetween being determined by the setting of said adjustment screw 30.

In the use of the present invention, a small incandescent light bulb 35 or the like is threaded into the aperture 26 in the frame member forward portion 25, said frame portion forming one complete thread, and in the preferred form of the invention a biased, apertured metal arm 36 (FIG. 1) is spot welded to said frame forward portion to provide additional anchoring means for the bulb threads, said structure eliminating the necessity for a relatively expensive socket. When said bulb is fully inserted therein, the center contact on the bulb base engages against the aforementioned brass conducting arm 33.

A conventional dry cell battery 37 is held by the aforementioned clamping legs 21 on the frame, and when so positioned said battery is normally spaced slightly from the flat spring 20 formed by the rear end portion of the frame, and the forward terminal of said battery is spaced slightly from said brass conducting arms 33. When the operating mechanism is thus completely assembled on the frame, a unitary cartridge is provided which can be easily slipped into the casing 10, and when the end members 11 and 18 are tightly threaded into place, the aforementioned gaskets 18 and 15 provide a leak-proof unit.

To actuate the buzzer and light mechanisms, the screw-switch 17 is manually turned inwardly until it bears against the flexible diaphragm 15, said diaphragm being pushed inwardly thereby into engagement with the flat, spring-like rear end portion 20 of the frame 19. As said frame portion 20 is deflected inwardly it contacts the base of the battery and urges said battery forwardly to a position where the forward terminal thereon contacts the aforementioned brass conducting arm 33. As described, said conducting arm is connected to the electrical coil 34, and the latter is connected to the metal arm 29 supporting the armature contact screw 30. The armature supporting bracket 22 is formed integrally with the metal frame 19, as described, and thus there is provided a complete electrical circuit.

When current flows through the electromagnet 34 the latter attracts the free end of the armature 31 and causes said armature to swing away from the contact screw 30. When this occurs, the circuit is momentarily broken, and the spring-like armature returns to its original position against the screw 30. The circuit is thus closed again, and the cycle repeated, the rapid armature vibrations creating a high-pitched, buzzing sound similar that emitted by a bug. The contact screw 30 can be manually turned upwardly or downwardly to alter the gap between said armature and the electromagnet 34 to regulate the frequency of the armature vibrations, and to thereby modify the pitch of the buzzing sound as desired. By means of said adjustment screw, the gap can also be narrowed from time to time by the user to compensate for gradual weakening of the battery. This is believed to be a new innovation in the art, and is an important feature of the present invention.

In the fully assembled unit the upturned forward end portion 25 of the frame 19 is designed to abut against the aforementioned shoulder formed by the cone 13. It has been found that this provides an effective sounding board and results in a resonant buzzing tone of the type desired.

In addition to the buzzing sound thus provided, when the circuit is closed the current also flows to the incandescent bulb 35 to light the same, the brass arm 33 being in contact with the bulb center terminal, as described, and the metal frame 19 completing the circuit to the battery base terminal. When said bulb is energized, the entire plastic cone 13 glows, producing a light which is very attractive to fish. For some purposes it might be preferred to utilize the fish caller without the light, and in this instance said bulb 35 can be disconnected from the circuit merely by unscrewing the same sufficiently to move its terminal away from said brass arm 33, thus taking said light bulb out of the circuit but leaving a complete circuit to the vibrating buzzer mechanism. Moreover, in the event it should be desired to use the light only, the buzzer mechanism can be disconnected merely by turning the adjustment screw 30 upwardly to a position where the gap between the armature and the electromagnet is great enough to render said buzzer inoperative.

To turn both the light and buzzer mechanisms off, the fisherman manually turns the screw-switch 17 rearwardly to the point where the spring-like frame end portion 20 disengages the base terminal of the battery, thus breaking the circuit and de-energizing said mechanisms.

From the foregoing detailed description it will be seen that the present invention provides a novel fish caller combining both audible and visual effects to attract fish.

What we claim is:

1. A fish caller, comprising: a hollow cylindrical casing body having a rearward end and a forward end; an end closure on the rearward end of said body casing; a flexible diaphragm covering the rearward end of said casing body; a shaft projecting through and longitudinally-movably carried in said casing end closure, said shaft being engageable with said flexible diaphragm; a metal frame in said casing body having a spring-like rear end member normally spaced forwardly slightly of said flexible diaphragm but being engageable thereby and adapted to be deflected forwardly when said shaft is moved forwardly, and said frame having means adapted to releasably hold a battery in a position with its base terminal normally spaced slightly forwardly of said frame rear end member but being engageable thereby when said frame end member is deflected forwardly; a dry cell battery carried by said frame; a buzzer mechanism carried by said frame, said buzzer mechanism being connected to the forward terminal on said battery and to said metal frame, thus providing a complete electrical circuit to said buzzer when the frame rear end member is in engagement with the battery base terminal; and an end closure mounted on the forward end of said casing body.

2. A fish caller, comprising: a hollow cylindrical casing body having a rearward end and a forward end; an end closure on the rearward end of said body casing; a flexible diaphragm covering the rearward end of said casing body; a shaft projecting through and longitudinally-movably carried in said casing end closure, said shaft being engageable with said flexible diaphragm; a metal frame in said casing body having a spring-like rear end member normally spaced forwardly slightly of said flexible diaphragm but being engageable thereby and adapted to be deflected forwardly when said shaft is moved forwardly, and said frame having means adapted to releasably hold a battery in a position with its base terminal normally spaced slightly forwardly of said frame rear end member but being engageable thereby when said frame end member is deflected forwardly; a dry cell battery carried by said frame; a light bulb carried by said frame adjacent the casing forward end, said light bulb being connected to the forward terminal on said battery and to said metal frame, thus providing a complete electrical circuit to said light bulb when the frame rear end member is in engagement with the battery base terminal; and a translucent end closure mounted on the forward end of said casing body.

3. A fish caller, comprising: a hollow cylindrical casing body having a rearward end and a forward end; an end closure on the rearward end of said body casing; a flexible diaphragm covering the rearward end of said casing body; a shaft projecting through and longitudinally-movably carried in said casing end closure, said shaft being engageable with said flexible diaphragm; a metal frame in said casing body having a spring-like rear end member normally spaced forwardly slightly of said flexible diaphragm but being engageable thereby and adapted to be deflected forwardly when said shaft is moved forwardly, and said frame having means adapted to releasably hold a battery in a position with its base terminal normally spaced slightly forwardly of said frame rear end member but being engageable thereby when said frame end member is deflected forwardly; a dry cell battery carried by said frame; a buzzer mechanism carried by said frame, said buzzer mechanism being connected to the forward terminal on said battery and to said metal frame, thus providing a complete electrical circuit to said buzzer when the frame rear end member is in engagement with the battery base terminal; a light bulb carried by said frame adjacent the casing forward end, said light bulb being connected to the forward terminal on said battery and to said metal frame, thus providing a complete electrical circuit to said light bulb when the frame rear end member is in engagement with the battery base terminal; and a translucent end closure mounted on the forward end of said casing body.

4. A fish caller, comprising: a hollow cylindrical casing body having a rearward end and a forward end; a cap threaded onto the rearward end of said body casing; a flexible sealing diaphragm interposed between said cap and the end of said casing body; a screw shaft projecting through and longitudinally-movably carried in said cap, said screw shaft being engageable with said flexible diaphragm; a metal frame in said casing body having a flat elongated base, having a spring-like rear end portion projecting upwardly from said base normally spaced slightly from said flexible diaphragm but being engageable thereby and adapted to be deflected forwardly when said screw shaft is turned forwardly, said frame having means adapted to releasably hold a battery in a position with its base terminal normally spaced slightly forwardly of said frame rear end portion but being engageable thereby when said frame end portion is deflected forwardly, and said frame having an armature bracket arm integral thereon forwardly of said battery retaining means; a dry cell battery carried by said frame; a side piece of non-conducting material secured to the side of said frame armature bracket; a conducting arm mounted on said side piece, said arm having a portion contacting the forward terminal on said battery; a spring-like armature mounted on said frame armature bracket and extending forwardly therefrom; a screw-supporting arm mounted on said side piece and extending laterally over said armature; a vertically-adjustable armature contact screw carried by said screw-supporting arm and bearing against the top of said armature; an electromagnet mounted on the frame base immediately below and spaced from the forward, free end of said armature; a lead wire connecting said conducting arm to said electromagnet; an opposite lead wire connecting said electromagnet to said screw-supporting arm, thus providing a complete electrical circuit to said electromagnet when the frame rear end portion is in engagement with the battery base terminal; and end closure means sealingly mounted on the forward end of said casing body.

5. A fish caller, comprising: a hollow cylindrical casing body having a rearward end and a forward end; a cap threaded onto the rearward end of said body casing, said cap having an internal, forwardly-facing annular shoulder, and said cap having a tapped, transverse bore therethrough; a flexible sealing diaphragm interposed between said cap annular shoulder and the abutting end of the casing body; a screw shaft projecting through and longitudinally-movably carried in said tapped cap bore, said screw shaft being engageable with said flexible diaphragm; a metal frame in said casing body having a flat elongated base, having an integral, flat spring rear end portion projecting upwardly at a right angle to said base normally spaced slightly from said flexible diaphragm but being engageable thereby and adapted to be deflected forwardly when said screw shaft is turned forwardly, said frame having means adapted to releasably hold a battery in a position with its base terminal normally spaced slightly forwardly of said frame rear end portion but being engageable thereby when said frame end portion is deflected forwardly, said frame having an armature bracket arm integral thereon forwardly of said battery retaining means, and said frame including an upright forward end portion having an aperture therethrough; a dry cell battery carried by said frame; a light bulb threaded into the apertured frame forward end portion; a side piece of non-conducting material secured to the side of said frame armature bracket; a conducting arm mounted on said side piece, said arm having a portion contacting the forward terminal on said battery, and said arm having a forward portion contacting the terminal on said light bulb; a flat, spring-like armature mounted on said frame armature bracket and extending forwardly therefrom; a screw-supporting arm mounted on said side piece and extending laterally over said armature; a vertically-adjustable armature contact screw carried by said screw-supporting arm and bearing against the top of said armature; an electromagnet mounted on the frame base immediately below and spaced from the forward, free end of said armature; a lead wire connecting said conducting arm to said electromagnet; an opposite lead wire connecting said electromagnet to said screw-supporting arm, thus providing a complete electrical circuit to said electromagnet and light bulb members when the frame rear end portion is in engagement with the battery base terminal; a translucent cone removably mounted on the forward end of the casing body; and sealing means interposed between said cone and casing members.

6. A fish caller, comprising: a hollow cylindrical casing body having a rearward end and a forward end; a cap threaded onto the rearward end of said body casing, said cap having an internal, forwardly-facing annular shoulder, and said cap having a tapped, transverse bore therethrough; a flexible sealing diaphragm interposed between said cap shoulder and the abutting end of the casing body; a screw shaft projecting through and longitudinally-movably carried in said tapped cap bore, said screw shaft being engageable with said flexible diaphragm; a unitary metal frame in said casing body having a flat elongated base, having an integral, flat spring rear end portion bent upwardly at a right angle to said base normally spaced slightly from said flexible diaphragm but being engageable thereby and adapted to be deflected forwardly when said screw shaft is turned forwardly, said unitary frame having spring-like, battery-retaining legs adapted to releasably hold a battery in a position with its base terminal normally spaced slightly forwardly of said frame rear end portion but being engageable thereby when said frame end portion is deflected forwardly, said frame having an armature bracket arm integral thereon forwardly of said battery retaining legs, and said frame including an upright forward end portion having an aperture therethrough; a dry cell battery carried by said retaining legs; a light bulb threaded into the apertured frame forward end portion; a side piece of non-conducting material secured to the side of said frame armature bracket; a metal conducting arm mounted on said side piece, said arm having a portion contacting the forward terminal on said battery, and said arm having a forward portion contacting the terminal on said light bulb; a flat, spring-like armature mounted on said frame armature bracket and extending forwardly therefrom; a screw-supporting arm mounted on said side piece and extending laterally over said armature; a vertically-adjustable armature contact screw carried by said screw-supporting arm and bearing against the top of said armature; an electromagnet mounted on the frame base immediately below and spaced from the forward, free end of said armature; a lead wire connecting said metal conducting arm to said electromagnet; an opposite lead wire connecting said electromagnet to said screw-supporting arm, thus providing a complete electrical circuit to said electromagnet and light bulb members when the frame rear end portion is in engagement with the battery base terminal; a translucent cone mounted on the forward end of the casing body, the rearward end of said cone abutting the upturned frame forward end; sealing means interposed between said cone and casing members; and a nut threaded onto the forward end of said casing to removably retain said cone in position thereon.

References Cited in the file of this patent
UNITED STATES PATENTS 2,218,408   Myerhoeffer _____ Oct. 15, 1940